United States Patent
Singhal et al.

(10) Patent No.: US 12,068,914 B2
(45) Date of Patent: Aug. 20, 2024

(54) SCTP MICRO-SERVICE HIGH AVAILABILITY IN PUBLIC/PRIVATE CLOUD

(71) Applicant: Parallel Wireless, Inc., Nashua, NH (US)

(72) Inventors: Mukesh Singhal, Pune (IN); Karuppasamy Kasirajan, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 18/183,155

(22) Filed: Mar. 13, 2023

(65) Prior Publication Data
US 2023/0291646 A1    Sep. 14, 2023

Related U.S. Application Data (60) Provisional application No. 63/318,829, filed on Mar. 11, 2022.

(51) Int. Cl.
 *H04L 41/0816* (2022.01)
(52) U.S. Cl.
 CPC ............................... *H04L 41/0816* (2013.01)
(58) Field of Classification Search
 CPC .................................................. H04L 41/0816
(Continued)

(56) References Cited

U.S. PATENT DOCUMENTS

| | | | |
|---|---|---|---|
| 11,924,165 B2* | 3/2024 | McDowall | H04W 12/30 |
| 2008/0069089 A1* | 3/2008 | Raisch | H04M 7/125 |
| | | | 370/355 |

(Continued)

FOREIGN PATENT DOCUMENTS

| WO | WO-2018154363 A1 * | 8/2018 | H04L 41/082 |
|---|---|---|---|

OTHER PUBLICATIONS

Jack Jia, "Building Unified PaaS Architecture for Agile Development," Apr. 7, 2017, Huawei Technologies Co., Ltd.

(Continued)

*Primary Examiner* — Hee Soo Kim
(74) *Attorney, Agent, or Firm* — Michael Y. Saji (57) ABSTRACT

In a first embodiment, a method is disclosed of providing Stream Control Transmission Protocol (SCTP) high availability in a cloud, the method comprising: keeping track, by an internal controller of an internal service discover framework, internal changes in a cluster; determining, by the internal controller, if any SCTP pods crash; informing, by the internal controller, remaining SCTP pods about changes in the environment; determining, by the controller, to distribute a number of connections in each remaining SCTP pod; and initiating, by the remaining pods, SCTP connection reestablishment. In a second embodiment, a Stream Control Transmission Protocol (SCTP) microservice system is disclosed comprising: an internal controller; a plurality of SCTP pods in communication with the internal controller; wherein the internal controller keeps track of internal changes in a cluster, determines if any SCTP pods crash; informs remaining SCTP pods about changes in the environment, and determines distribution of a number of connections in each remaining SCTP pod; and wherein the remaining pods initiate SCTP connection reestablishment.

20 Claims, 10 Drawing Sheets

(58) Field of Classification Search
USPC .......................................................... 709/231
See application file for complete search history.

(56) References Cited

U.S. PATENT DOCUMENTS

| | | | |
|---|---|---|---|
| 2010/0218034 A1* | 8/2010 | Sirigiri | G06F 11/2048 714/4.12 |
| 2016/0127169 A1 | 5/2016 | Rosa de Sousa Teixeira et al. | |
| 2018/0376338 A1 | 12/2018 | Ashrafi | |
| 2019/0163514 A1* | 5/2019 | Radunovic | H04L 67/1008 |
| 2020/0042365 A1 | 2/2020 | Tanna et al. | |
| 2020/0252489 A1* | 8/2020 | Hooker | G06F 11/0757 |
| 2021/0328858 A1* | 10/2021 | Asveren | H04L 61/5007 |
| 2022/0116285 A1* | 4/2022 | Abdollahi Vayghan | H04L 41/5012 |
| 2022/0276929 A1* | 9/2022 | Prashant | G06F 11/1662 |

OTHER PUBLICATIONS

"Enterprise Service Bus," Wikipedia, the free encyclopedia, Retrieved Jul. 30, 2018.

Jorg Niemoller, Ioannis Fikouras, Frans De Rooij, Lucas Klostermann, Ulf Stringer, Ulf Olsson, "Ericsson Composition Engine—Next-generation IN," Jan. 2009, Ericsson Review (English Edition).

Falko Menge, "Enterprise Service Bus," Free and Open Source Software Conference 2007.

"Etisalat Transforms BBS With Ericsson," Dec. 18, 2013, Light Reading, an Informa business, trading within KNect365 US, Inc.

Jeffery Vogel, Michael Stricklen, "How Loosely Coupled Architectures are Helping the Modernization of Legacy Software," Oct. 2, 2017, EYGM Limited (Formerly Bulger Partners).

"Loose Coupling," Wikipedia, the free encyclopedia, Retrieved Jul. 30, 2018.

Jurgen Kress, Berthold Maier, Hajo Normann, Danilo Schmeidel, Guido Schmutz, Bernd Trops, Clemens Utschig-Utschig, Torsten Winterberg, "Enterprise Service Bus," Jul. 2013, Oracle Technical Resources (Formerly Oracle Technology Network).

Richard Watson, "How to Architect and Design Cloud-Native Applications," Dec. 29, 2015, Gartner Research, ID G00296114, retrieved from https://www.gartner.com/en/documents/3181919.

"ICT Platform for Digital Communication Providers," Sep. 2, 2015, Ericsson and TIBCO Software, Inc.

\* cited by examiner

SCTP MICRO-SERVICE HIGH AVAILABILITY IN PUBLIC/PRIVATE CLOUD

CROSS-REFERENCE TO RELATED APPLICATIONS

This application claims priority under 37 C.F.R. § 119(e) to U.S. Provisional Patent Application No. 63/318,829, having the same title as the present application and filed on Mar. 11, 2022, which is hereby incorporated by reference in its entirety for all purposes. The present application also hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes, 71710US01, 71717US01, 71721US01, 71756US01, 71762US01, 71819US00, and 71820US01, respectively. This application also hereby incorporates by reference in their entirety each of the following U.S. Pat. applications or Pat. App. Publications: US20150098387A1 (PWS-71731US01); US20170055186A1 (PWS-71815US01); US20170273134A1 (PWS-71850US01); US20170272330A1 (PWS-71850US02); and Ser. No. 15/713,584 (PWS-71850US03). This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019. This application also incorporates by reference the U.S. patent application, filed 2022 Aug. 16 with application Ser. No. 17/819,950 and title "4G/5G Open RAN CU-UP High Availability Solution"; the U.S. patent application, filed 2022 Dec. 19 with application Ser. No. 18/068,520 and title "CU-CP High Availability"; and the U.S. patent application, filed 2022 Dec. 29 with application Ser. No. 18/148,432 and title "Singleton Microservice High Availability."

BACKGROUND

Stream Control Transmission protocol (SCTP) is a protocol heavily used in telecom products. High availability of 5G/4G products or any other product & services which uses SCTP, is desirable in any public cloud/private cloud or bare metal environment.

Open RAN is the movement in wireless telecommunications to disaggregate hardware and software and to create open interfaces between them. Open RAN also disaggregates RAN from into components like RRH (Remote Radio Head), DU (Distributed Unit), CU(Centralized Unit), Near-RT(Real-Time) and Non-RT(Real-Time) RIC(RAN Intelligence Controller). Below is the Open RAN architecture as defined by ORAN alliance.

CU function is split into CU-CP (Control Plane) and CU-UP (User Plane) function to provide Control and User Plane separation. Open RAN solution needs to support: Open Interfaces between different functions; Software based functions; Cloud Native functions; Intelligence support via support for xApps/rApps; 3rd Party RRHs; Disaggregated functions; White Box COTS hardware support; and Data Path separated from Control plane traffic.

Abbreviations Used in this Disclosure

CU-CP: This node handles RRC and the control plane part of the PDCP protocol. This node communicates with DU over F1-C interface and with CU-UP over E1 interface as defined in 3GPP specifications.

CU-UP/s: This node handles user plane part of PDCP protocol and SDAP protocol. It communicates with CU-CP over E1 interface and with DU over F1-U interface.

SMO (Service management and orchestration): control of infra structure component like CPU/Memory and scale up and scale down operations.

FCAPS (Fault, Configuration, Security, Performance, Accounting) management of Open-RAN elements (gNB-CU-CP, gNB-CU-UP, gNB-DU)

AMF/SMF: 3GPP defined 5G core network element for control signaling.

UPF: 3GPP defined 5G core network element for data-plane traffic.

DU (gNB-DU): 3GPP defined 5G access network element.

SUMMARY

This disclosure provides Stream Control Transmission protocol (SCTP) high availability in a cloud environment. In one embodiment, a method of providing SCTP high availability in a cloud includes keeping track, by an internal controller of an internal service discover framework, internal changes in a cluster; determining, by the internal controller, if any SCTP pods crash; informing, by the internal controller, remaining SCTP pods about changes in the environment; determining, by the controller, to distribute a number of connections in each remaining SCTP pod; and initiating, by the remaining pods, SCTP connection reestablishment.

In another embodiment a Stream Control Transmission Protocol (SCTP) microservice system includes an internal controller; a plurality of SCTP pods in communication with the internal controller; wherein the internal controller keeps track of internal changes in a cluster, determines if any SCTP pods crash; informs remaining SCTP pods about changes in the environment, and determines distribution of a number of connections in each remaining SCTP pod; and wherein the remaining pods initiate SCTP connection reestablishment.

A method is disclosed of providing Stream Control Transmission Protocol (SCTP) high availability in a cloud, the method comprising: keeping track, by an internal controller of an internal service discover framework, internal changes in a cluster; determining, by the internal controller, if any SCTP pods crash; informing, by the internal controller, remaining SCTP pods about changes in the environment; determining, by the controller, to distribute a number of connections in each remaining SCTP pod; and initiating, by the remaining pods, SCTP connection reestablishment A Stream Control Transmission Protocol (SCTP) microservice system is also disclosed comprising: an internal controller; a plurality of SCTP pods in communication with the internal controller; wherein the internal controller keeps track of internal changes in a cluster, determines if any SCTP pods crash; informs remaining SCTP pods about changes in the environment, and determines distribution of a number of connections in each remaining SCTP pod; and wherein the remaining pods initiate SCTP connection reestablishment.

DETAILED DESCRIPTION

Microservice architecture provides high availability and scalability for stateless services seamlessly. But session created on SCTP association can be lost if one of the SCTP pod crashes and existing connection are not restored in time bound manner.

For example, in some embodiments, SCTP a microservice acting as server endpoint and thousands of peer SCTP nodes can connect with SCTP IP of microservice. Any new SCTP connection will be given to any of the pods of SCTP-microservice. One SCTP connection/association will be terminated on one of SCTP pod only and further traffic related to that association will flow via this connection/association only. Each SCTP pod is over provisioned to handle additional load/connection if any of the POD is to fail. Backend pods are for other protocol processing.

SCTP pod will have perhaps 300 connections, and 100 k subscribers. When SCTP goes down, how do we handle? Other SCTP worker nodes need to take over the connections (need to reinitiate connections to the other SCTP end. We need to do this before peer nodes detect heartbeat down. We don't want peer nodes to mark these connections as down, and also to drop the sessions. So we want to hand over these things to the other SCTP worker pods. (Which manage access to the peer nodes. L4 protocol, so each pod takes care of an association between a peer node and our system.

A new SCTP+F1-Microservice is added, which is an internal Microservice in CU-CP cluster to handle SCTP+F1-APP interface signaling with gNB-DU. F1 & SCTP interface terminates at F1-microservice. F1-Demux exposes at least 1 public IP to gNB-DU to communicate.

Figure 1:
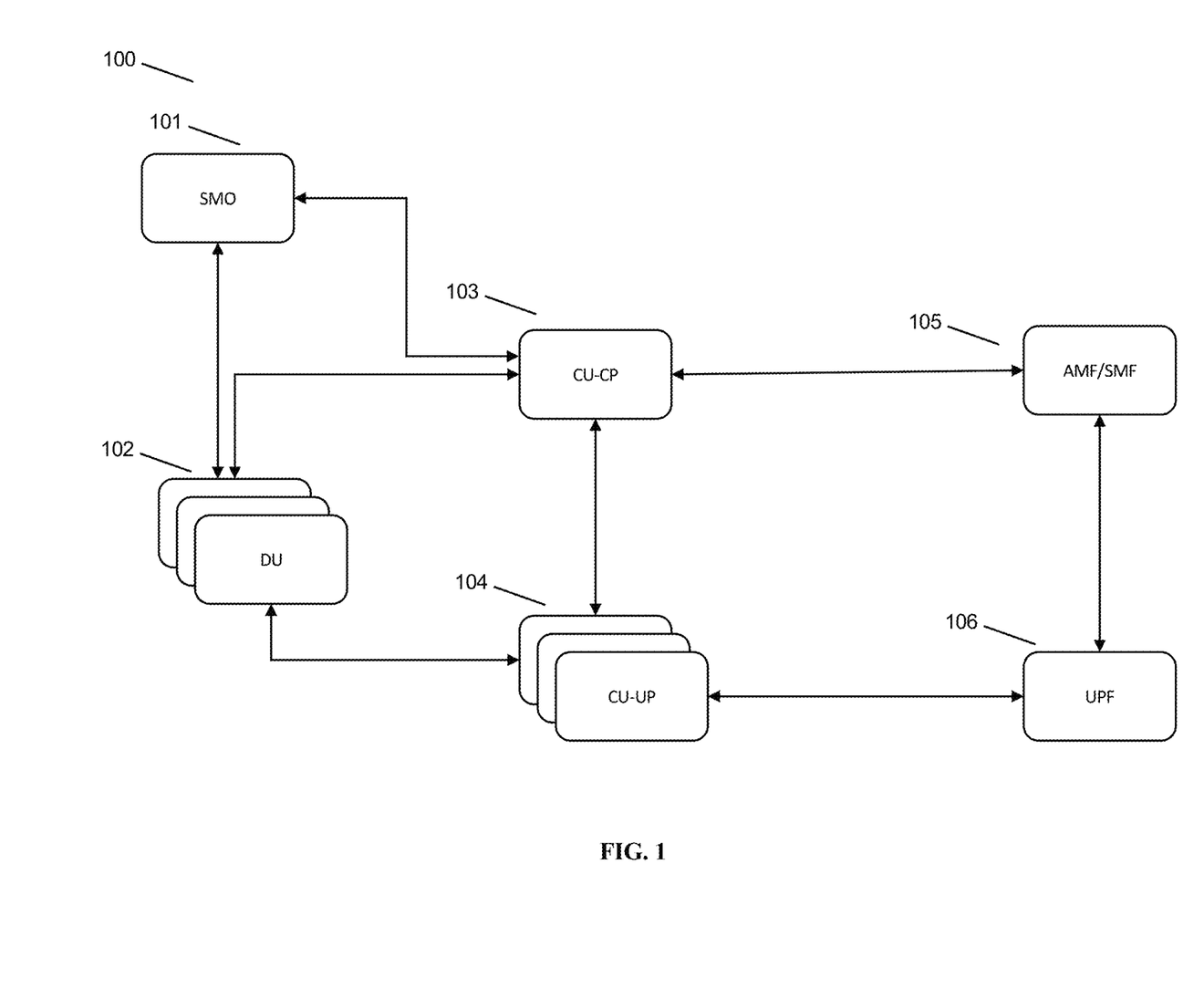
FIG. 1 is a schematic diagram of a 5G core, in accordance with some embodiments.

FIG. 1 shows a schematic diagram 100 of a CU-CP Open RAN architecture, in accordance with a 5G architecture. CU-CP 103 is in communication with a plurality of DUs 102, with one or more CU-UPs 104, service management and orchestration node (SMO) 101, and AMF/SMF 105. UPF 106 is also in communication with AMF/SMF and CU-UP.

Figure 2:
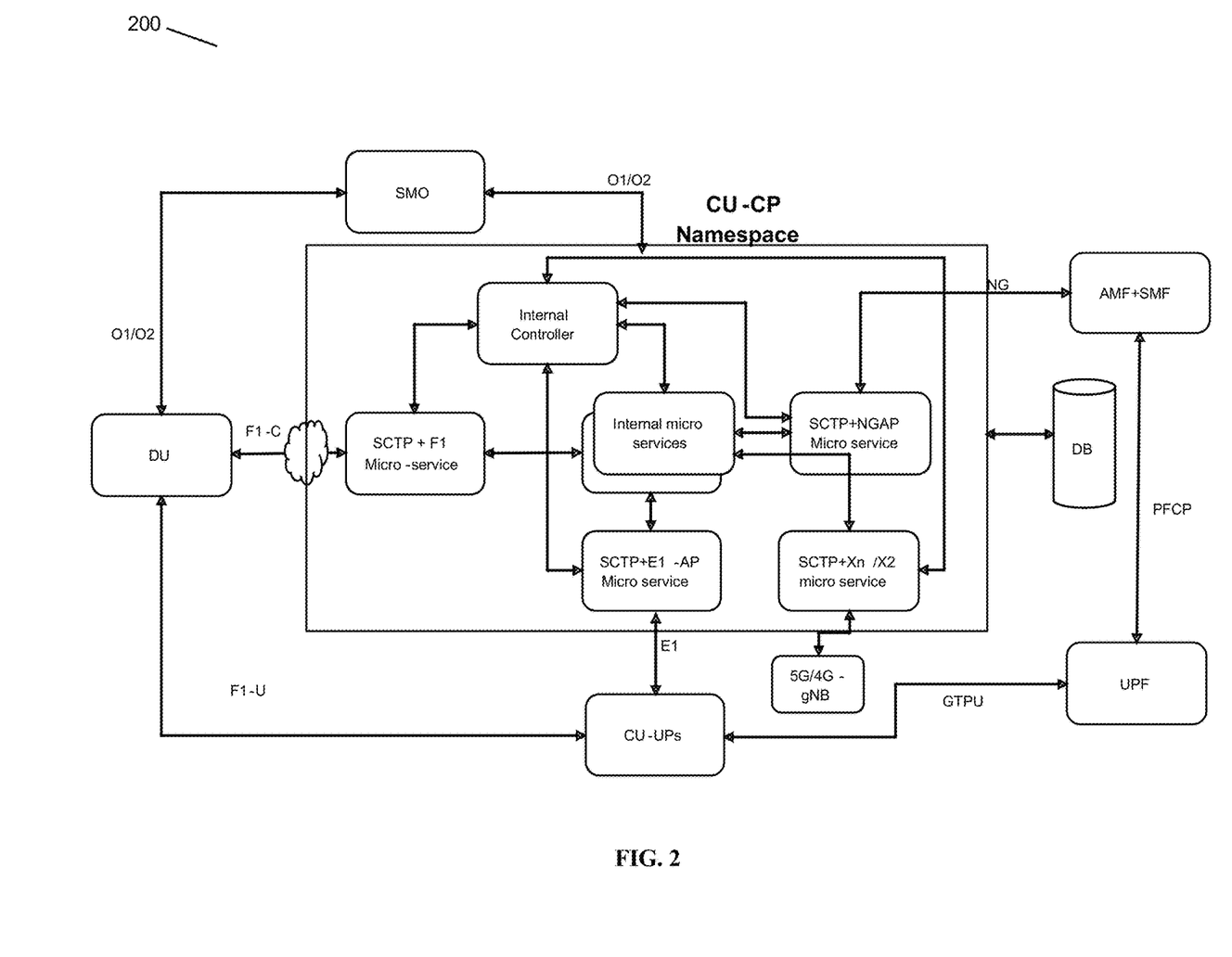
FIG. 2 is a schematic diagram of a CU-CP namespace, in accordance with some embodiments.

FIG. 2 shows a CU-CP internal logical architecture and internal nodes shown as microservices, in accordance with some embodiments. A variety of microservices provide the benefits of a microservices-based architecture, such as massively parallel processing, restart and management and availability, advanced monitoring, etc. This microservices architecture enables 4G and 5G, as shown, and can be readily extended to 2G and 3G as well (not shown). All of these nodes can use microservices, in some embodiments. However, although a microservice architecture provides high availability and scalability for stateless services seamlessly, it is noted that a session created on SCTP association can be lost if one of the SCTP pods (microservices) crashes and existing connection are not restored in time-bound manner.

Figure 3:
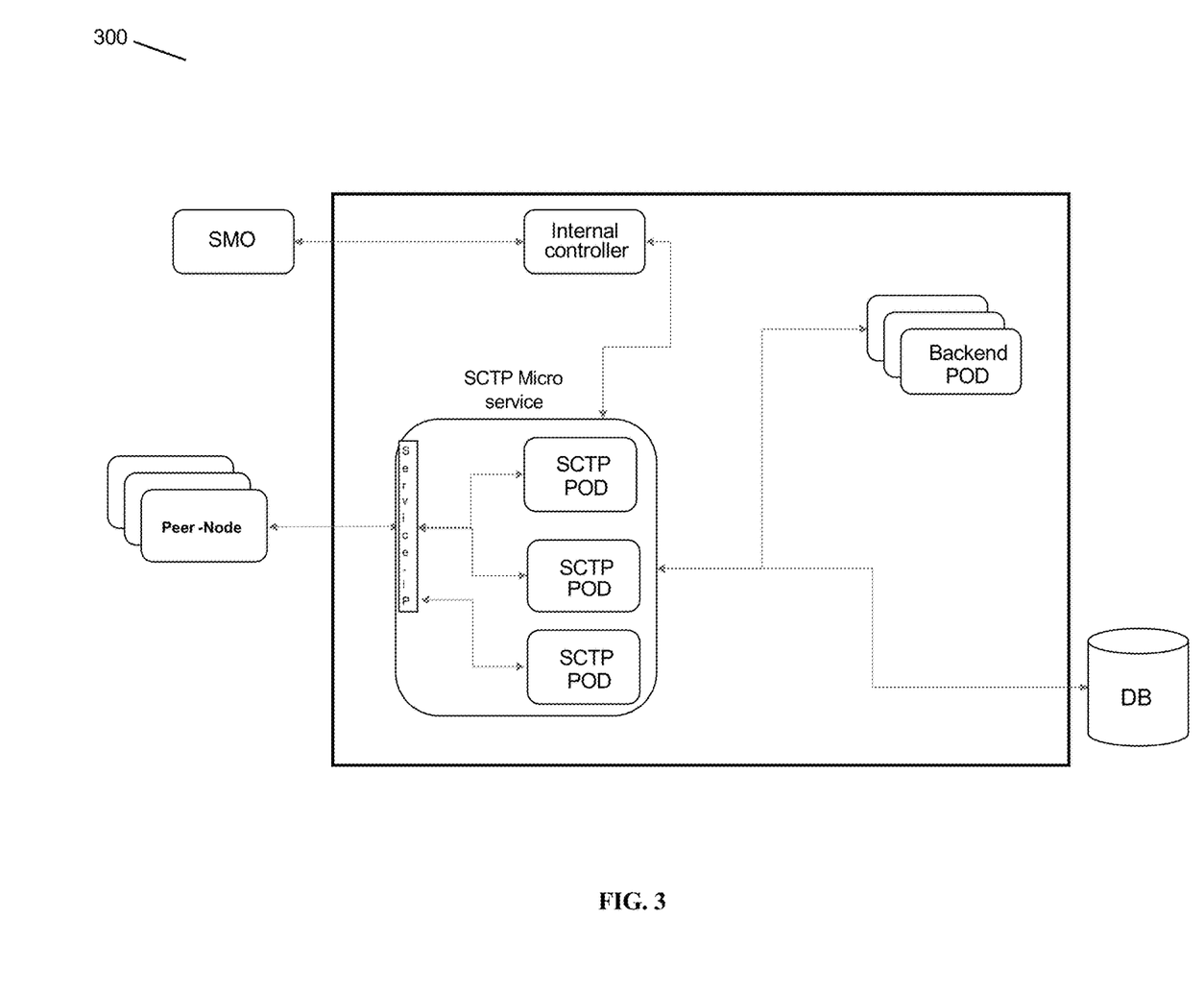
FIG. 3 is a schematic diagram of an SCTP microservice, in accordance with some embodiments.

FIG. 3 is a schematic diagram of an SCTP microservice, in accordance with some embodiments. An active-active model is shown, wherein one microservice is the primary and another microservice is the backup, with both being active and the backup ready to take over at any time.

Since any new SCTP connection will be given to any of the pods of SCTP-microservice, and one SCTP connection/association will be terminated on one of SCTP pod only and further traffic related to that association will flow via this connection/association only, each SCTP pod is over provisioned with additional active pods to handle additional load/connection if any of the pods is to fail, as shown. This provides high availability.

Figure 4:
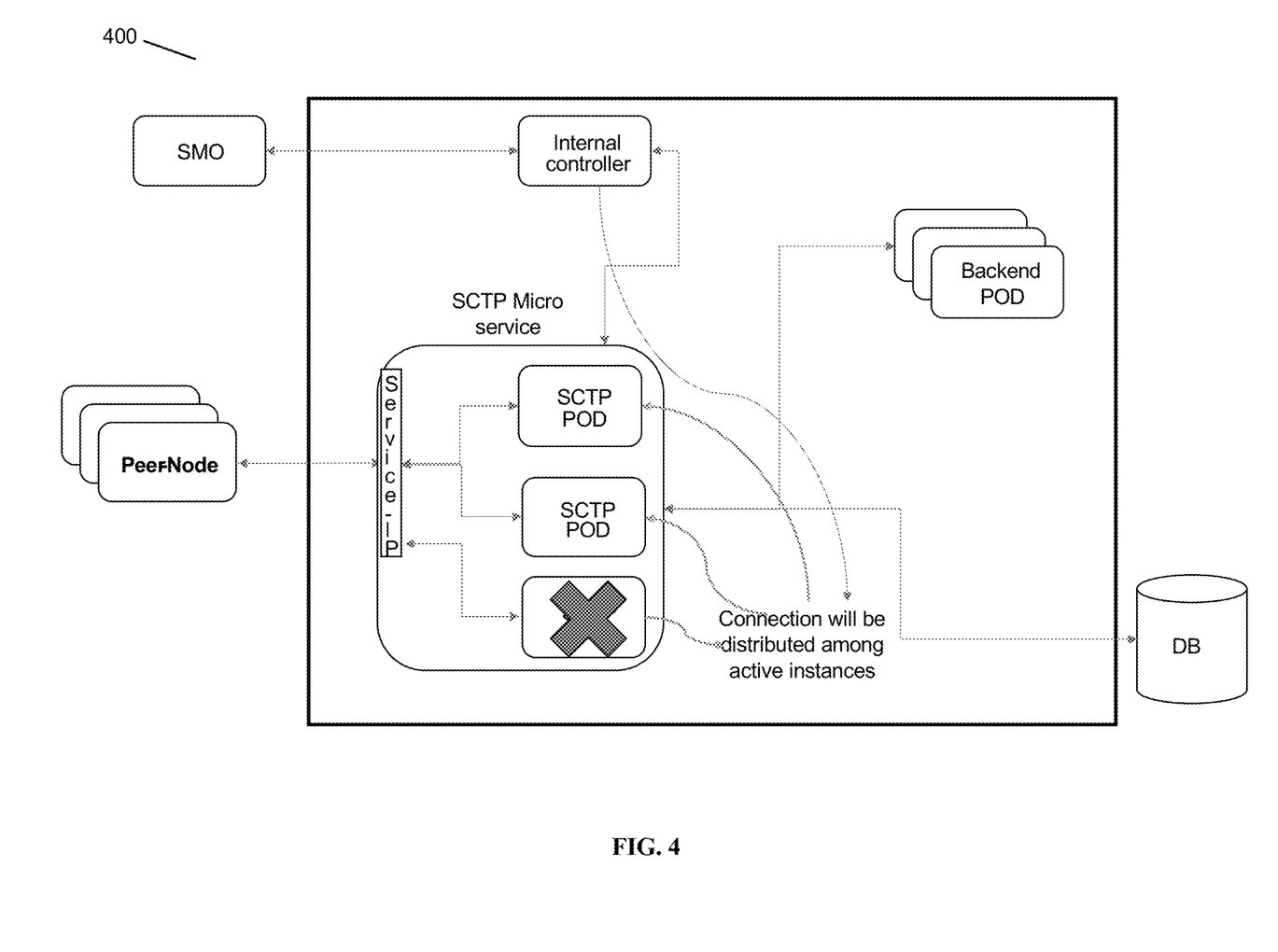
FIG. 4 is a schematic diagram of an SCTP microservice with failover, in accordance with some embodiments.

FIG. 4 shows an example of one of the pods of SCTP micro service crashed, in accordance with some embodiments. Subscriber Sessions built on top of SCTP association are tightly linked with SCTP association. If association is lost due to any reason and peer node identify heart-beat failure of SCTP association then all the subscriber latched via specific association will be lost. That would result into service outage for some of the peer nodes.

Detection & Crash Handling

With internal service discovery framework depicted in following diagram, internal controller will keep track of internal changes in given namespace/cluster. If any of the SCTP pod crashes, internal controller would inform remaining SCTP pods about changes in the environment.

Internal controller would also help in making decision to distribute the number of connections in each remaining SCTP pod. Remaining pods would immediately initiate SCTP connection re-establishment procedure to avoid any failure detection by peer node. Once this procedure is complete, All the subscriber sessions will be unimpacted. Whole procedure can be completed very quickly in matter of milli-seconds to seconds only.

All the information of SCTP connection and session linked with SCTP association will be available in key-value database shown in diagram. SCTP pods can fetch any information required from the database microservice.

Internal controller. It keeps track of health of all pods & micro services in a given namespace. As soon as any pod/container crashes, it updates the remaining pods. And takes necessary steps to bring system in workable state.

Database (Service registry). This database act as service registry database for all pods and microservice in given namespace. All the pods on start-up can update required information in database & fetch required information from service registry database.

Figure 5:
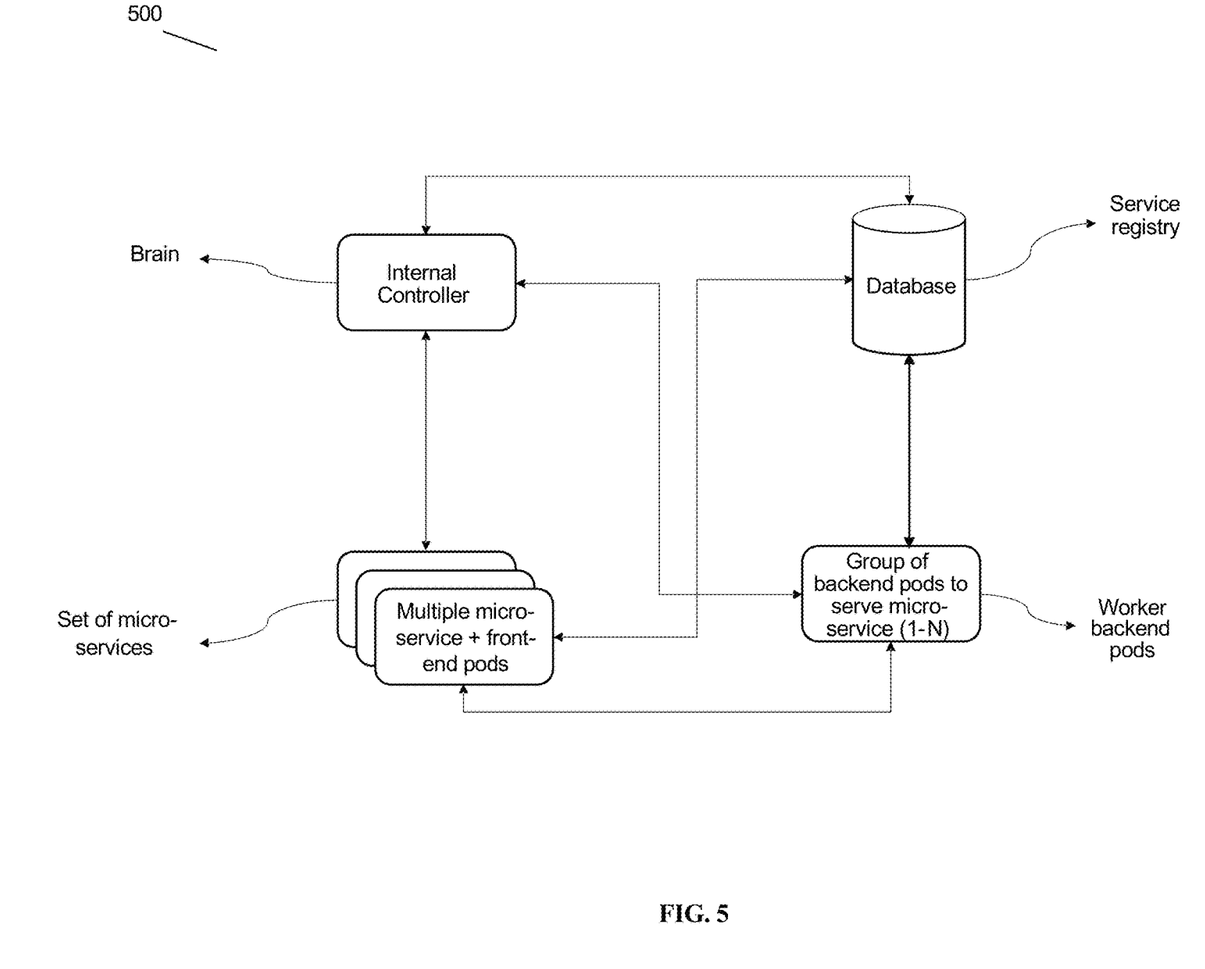
FIG. 5 is a schematic diagram of a microservice control architecture, in accordance with some embodiments.

FIG. 5 is a schematic diagram of a microservice control architecture, in accordance with some embodiments. Shown is a schematic diagram showing a pod microservice logical architecture with front and back-end pods, in accordance with some embodiments. A plurality of front-end pods for terminating connections and back-end pods for handling and processing traffic is in communication with a database; the database handles registration of the pods as described below. Other nodes, such as peer nodes, interface with the microservice via a particular service IP, and routing is performed within the microservice to the front end pods and back end pods, in some embodiments by a routing pod.

In some embodiments, an internal controller keeps track of health of some or all pods & micro services in a given namespace. As soon as any pod/container crashes, it updates the remaining pods. And takes necessary steps to bring system in workable state.

In some embodiments, a database (Service registry) may act as service registry database for some or all pods and microservice in given namespace. All the pods on start-up can update required information in database & fetch required information from service registry database.

The disclosed high availability solution is intended to enhance availability of a single pod solution, as follows. In Kubernetes, a Pod (as in a pod of whales or pea pod) is a group of one or more containers, with shared storage and network resources, and a specification for how to run the containers. A Pod's contents may be co-located and co-scheduled, and run in a shared context. A Pod models an application-specific "logical host": it contains one or more application containers which are relatively tightly coupled. In non-cloud contexts, applications executed on the same physical or virtual machine are analogous to cloud applications executed on the same logical host. Pods get their own IP and services get a cluster IP. Cluster IP is internal only. Kubernetes creates a cluster when a pod is created. Kubernetes supports a method for tracking which pods are available and/or down. It tracks which ones are live and which ones are down. While Kubernetes is described herein, other container management and orchestration methods are understood to be supported in the spirit of the present disclosure.

Pods are configured in Kubernetes using YAML files. A controller for the resource handles replication and rollout and automatic healing in case of Pod failure. For example, if a Node fails, a controller notices that Pods on that Node have stopped working and creates a replacement Pod. The scheduler places the replacement Pod onto a healthy Node.

In telecom, it is desirable to have a single controller running at a single time, not multiple controllers. This is because there are often situations where state is required to be kept at the service provider. This results in a single controller being visible, and, standby controller being invisible to others. However, Kubernetes does not have any concept of active and standby, and this concept is facilitated by the addition of labels or selectors as follows.

There are a variety of other higher-layer protocols and interfaces, such as F1, E1, Xn/X2, NGAP. No higher layer communication or change to these higher-layer protocols is needed to provide HA specifically for these. But since these protocols are implemented on top of SCTP, this approach also provides HA for these higher-layer protocols as well. Any protocols that sit on top of SCTP or using SCTP as a transport would be enabled with HA using this mechanism, in some embodiments. This would apply to 2G, 3G, 4G, 5G, or any other SCTP-reliant protocol.

Internal discovery. Internal controller. All pods register with internal database, and, internal controller. Internal controller does heartbeat monitoring. Death notification is advertised by controller to the remaining pods.

Database keeps the information. We will keep the info of connections and sessions inside the DB (which in some embodiments can be external to the CU-CP node, or can be internal). See "Detection & crash handling" section in the disclosure document.

Is there any risk that reestablishing hundreds of connections will be a problem?—Not expected to be a problem. Hundreds of connections, 5,000 connections can be reestablished in under a second. SCTP is a lightweight protocol. OK to reestablish all connections in one go. The DU nodes are available. The HNG is capable as well (coordinating node as described herein).

Is the information on the DB very heavy? No. Targeting overall high availability in milliseconds.

Figure 6:
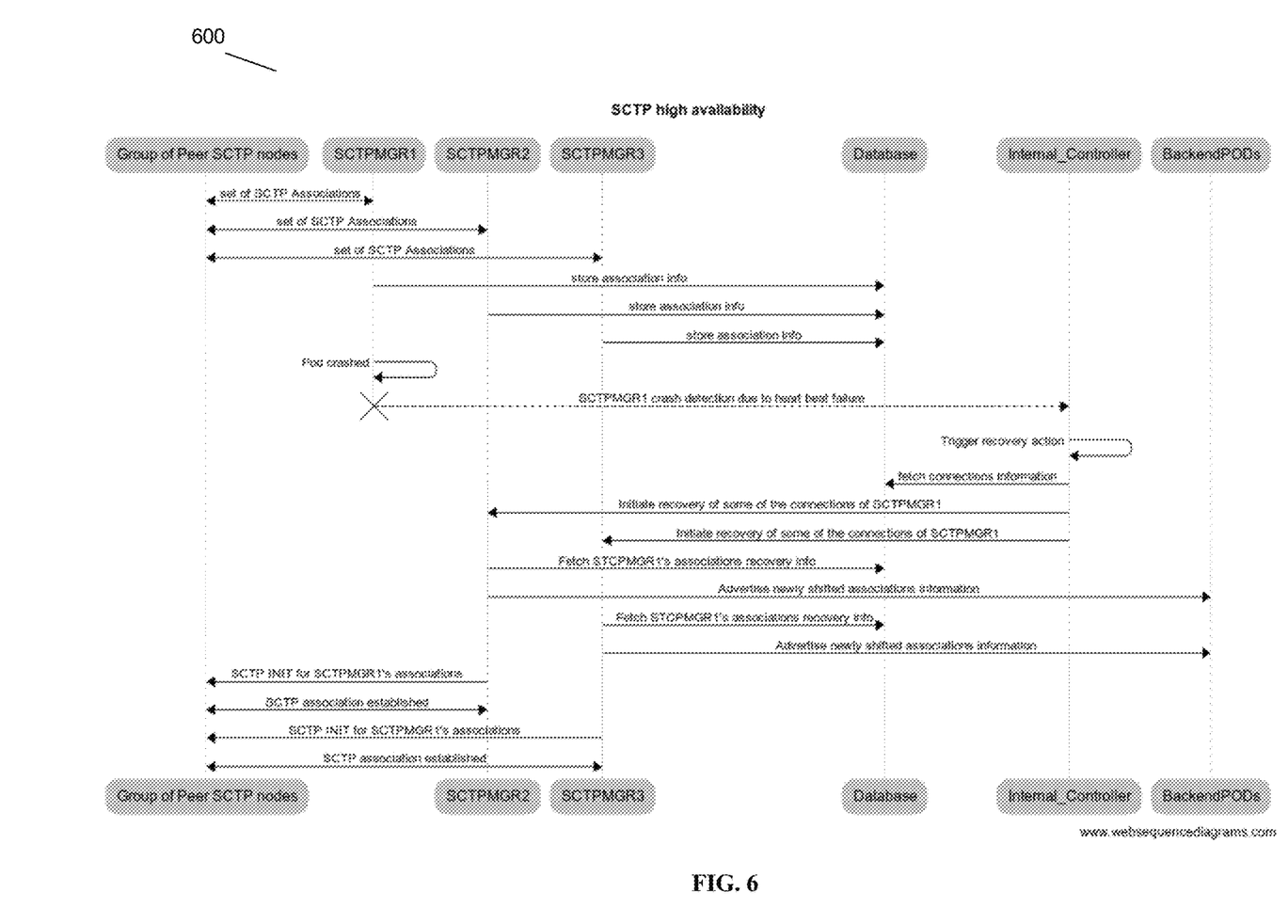
FIG. 6 is a schematic diagram of an SCTP high availability call flow, in accordance with some embodiments.

FIG. 6 is a schematic diagram of an SCTP high availability call flow, in accordance with some embodiments. Three SCTP managers are shown, SCTPMGR1, SCTPMGR2, and SCTPMGR3. The group of peer SCTP nodes shares the set of SCTP associations with the SCTP managers, and the SCTP managers store the association info with the database. The internal controller performs a heartbeat function and monitors the status of the SCTP managers. Heartbeat and monitoring may be performed in accordance with well-understood container and Kubernetes mechanics. When a heartbeat is missed, it is noticed within a suitable interval and the controller triggers a recovery action, by fetching connection information from the database, initiating recovery of the connections of the failed SCTP manager (with the individual connections spread out between the other SCTP managers, and/or on one SCTP manager in some embodiments). Once the other failover SCTP managers have completed the recovery of the requested connections internal to the failover SCTP managers, the newly advertised associations are updated in the database and the internal controller. The backend pods are also updated with the new associations. SCTP INIT is then performed by the new SCTP managers to their clients to complete SCTP association.

Figure 7:
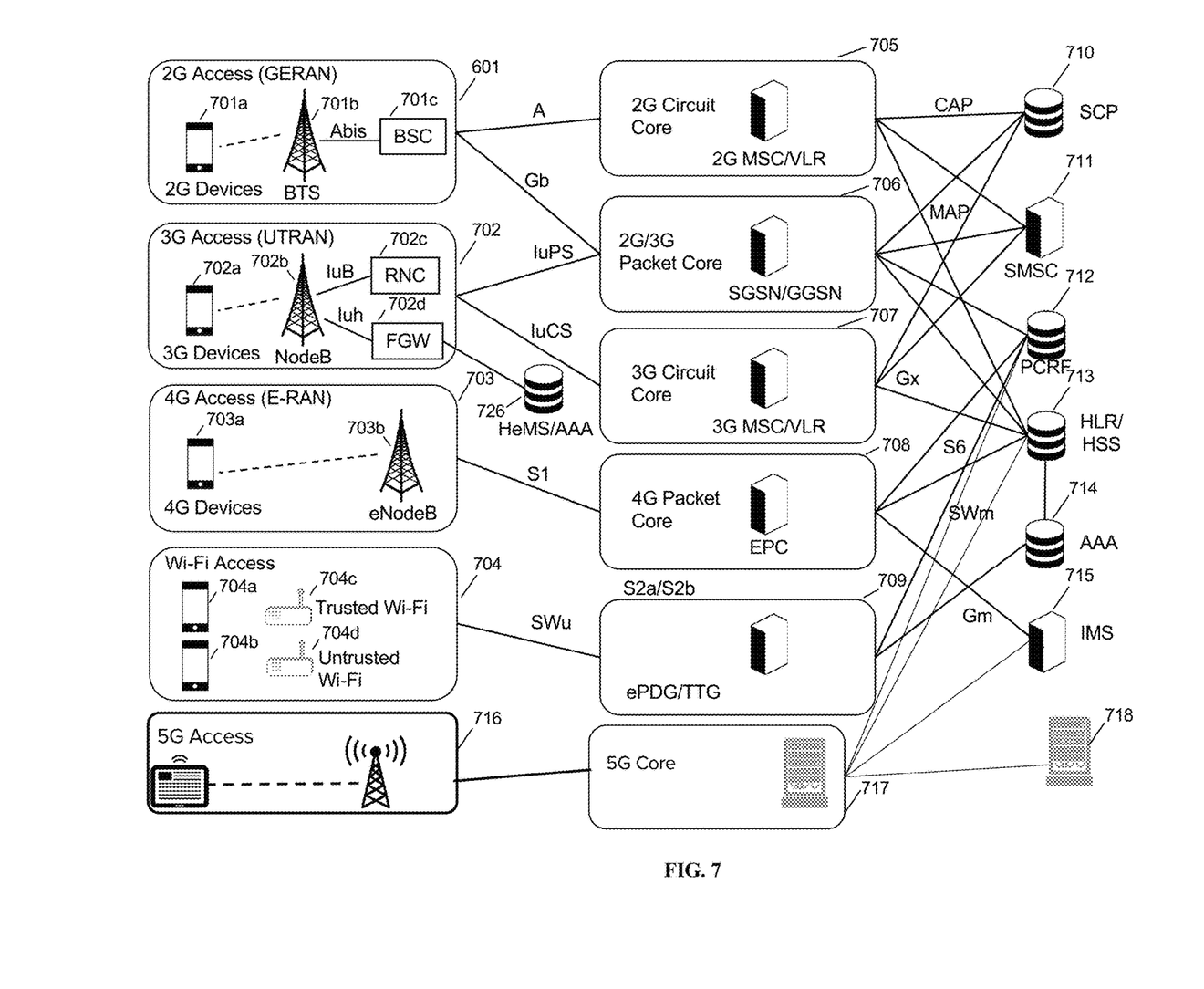
FIG. 7 is a schematic diagram of a multi-RAT core network architecture, in accordance with some embodiments.

FIG. 7 is a schematic diagram of a multi-RAT core network architecture, in accordance with some embodiments. A schematic network architecture diagram for 3G and other-G prior art networks is shown. The diagram shows a plurality of "Gs," including 2G, 3G, 4G, 5G and Wi-Fi. 2G is represented by GERAN 701, which includes a 2G device 701a, BTS 701b, and BSC 701c. 3G is represented by UTRAN 702, which includes a 3G UE 702a, nodeB 702b, RNC 702c, and femto gateway (FGW, which in 3GPP namespace is also known as a Home nodeB Gateway or HNBGW) 702d. 4G is represented by EUTRAN or E-RAN 703, which includes an LTE UE 703a and LTE eNodeB 703b. Wi-Fi is represented by Wi-Fi access network 704, which includes a trusted Wi-Fi access point 704c and an untrusted Wi-Fi access point 704d. The Wi-Fi devices 704a and 704b may access either AP 704c or 704d. In the current network architecture, each "G" has a core network. 2G circuit core network 705 includes a 2G MSC/VLR; 2G/3G packet core network 706 includes an SGSN/GGSN (for EDGE or UMTS packet traffic); 3G circuit core 707 includes a 3G MSC/VLR; 4G circuit core 708 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 730, the SMSC 731, PCRF 732, HLR/HSS 733, Authentication, Authorization, and Accounting server (AAA) 734, and IP Multimedia Subsystem (IMS) 735. An HeMS/AAA 736 is present in some cases for use by the 3G UTRAN. The diagram is used to indicate schematically the basic functions of each network as known to one of skill in the art, and is not intended to be exhaustive. For example, 5G core 717 is shown using a single interface to 5G access 716, although in some cases 5G access can be supported using dual connectivity or via a non-standalone deployment architecture.

Noteworthy is that the RANs 701, 702, 703, 704 and 736 rely on specialized core networks 705, 706, 707, 708, 709, 737 but share essential management databases 730, 731, 732, 733, 734, 735, 738. More specifically, for the 2G GERAN, a BSC 701c is required for Abis compatibility with BTS 701b, while for the 3G UTRAN, an RNC 702c is required for Iub compatibility and an FGW 702d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 8:
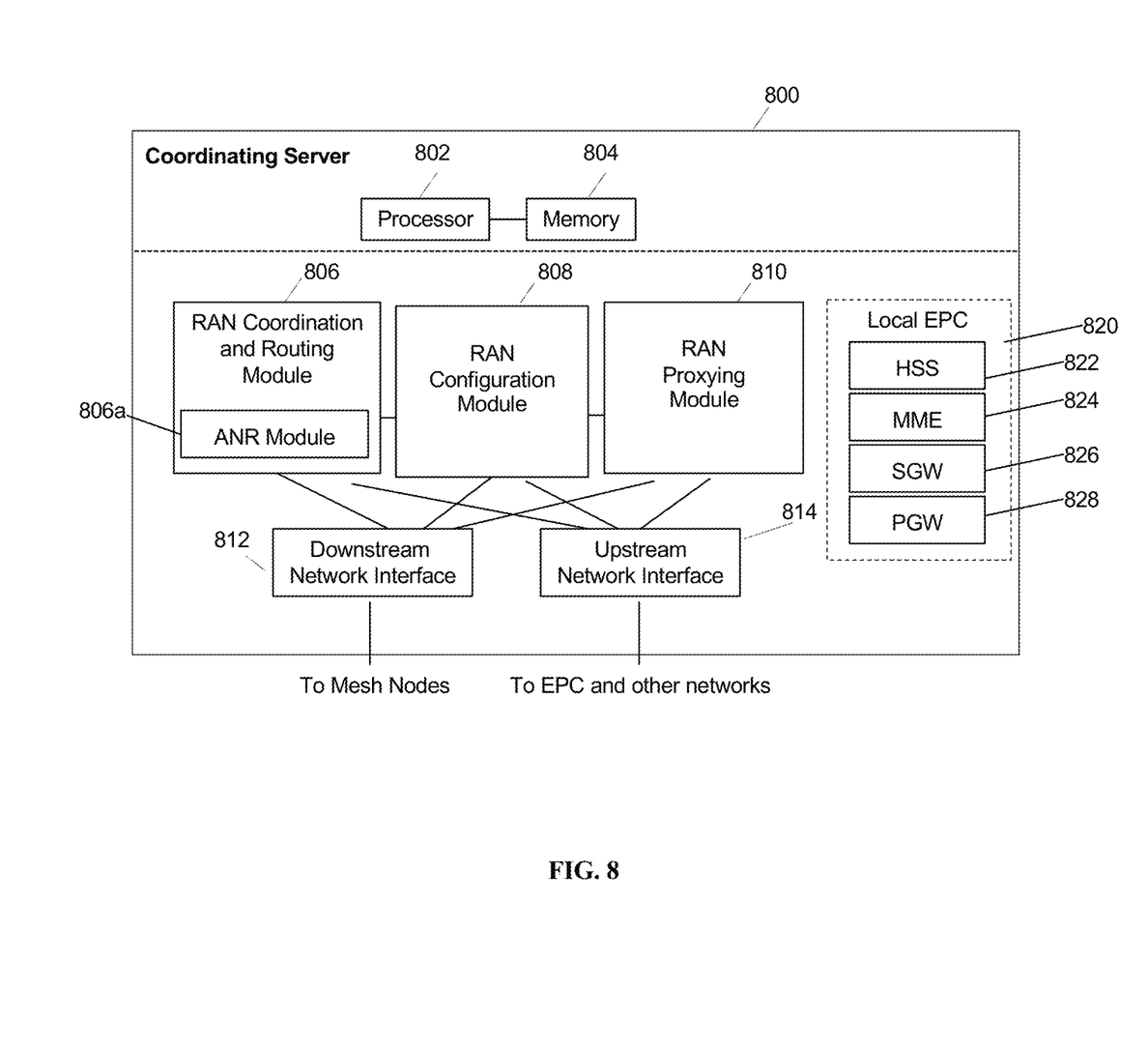
FIG. 8 is a schematic diagram of a coordinating server, in accordance with some embodiments.

FIG. 8 is a schematic diagram of a coordinating server, in accordance with some embodiments. Shown is a coordinating server for providing services and performing methods as described herein, in accordance with some embodiments. Coordinating server 800 includes processor 802 and memory 804, which are configured to provide the functions described herein. Also present are radio access network coordination/routing (RAN Coordination and routing) module 806, including ANR module 806a, RAN configuration module 808, and RAN proxying module 810. The ANR module 806a may perform the ANR tracking, PCI disambiguation, ECGI requesting, and GPS coalescing and tracking as described herein, in coordination with RAN coordination module 806 (e.g., for requesting ECGIs, etc.). In some embodiments, coordinating server 800 may coordinate multiple RANs using coordination module 806. In some embodiments, coordination server may also provide proxying, routing virtualization and RAN virtualization, via modules 810 and 808. In some embodiments, a downstream network interface 812 is provided for interfacing with the RANs, which may be a radio interface (e.g., LTE), and an upstream network interface 814 is provided for interfacing with the core network, which may be either a radio interface (e.g., LTE) or a wired interface (e.g., Ethernet).

Coordinator 800 includes local evolved packet core (EPC) module 820, for authenticating users, storing and caching priority profile information, and performing other EPC-dependent functions when no backhaul link is available. Local EPC 820 may include local HSS 822, local MME 824, local SGW 826, and local PGW 828, as well as other modules. Local EPC 820 may incorporate these modules as software modules, processes, or containers. Local EPC 820 may alternatively incorporate these modules as a small number of monolithic software processes. Modules 806, 808, 810 and local EPC 820 may each run on processor 802 or on another processor, or may be located within another device.

Figure 9:
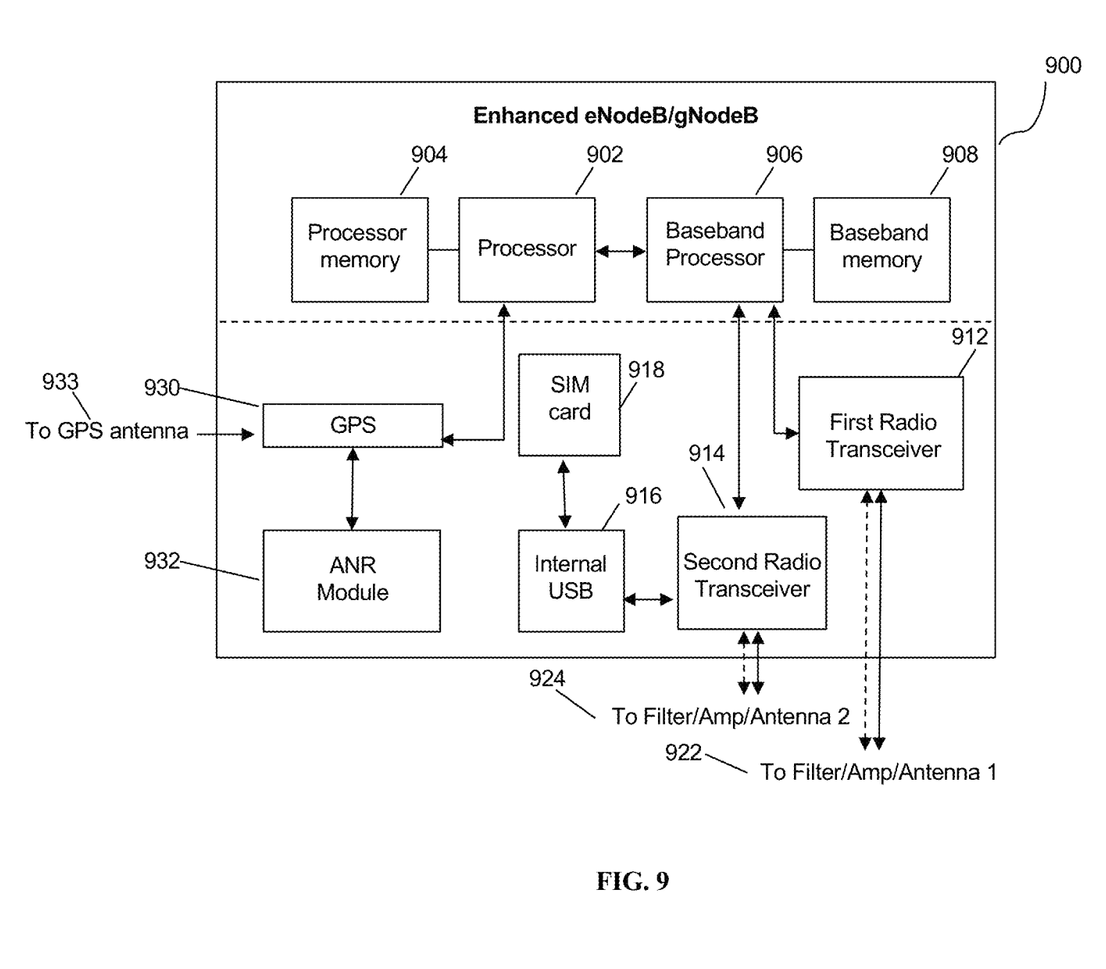
FIG. 9 is a schematic diagram of an enhanced eNodeB/gNodeB, in accordance with some embodiments.

FIG. 9 is a schematic diagram of an enhanced eNodeB/gNodeB, in accordance with some embodiments. Shown is an enhanced eNodeB for performing the methods described herein, in accordance with some embodiments. eNodeB 900 may include processor 902, processor memory 904 in communication with the processor, baseband processor 906, and baseband processor memory 908 in communication with the baseband processor. Mesh network node 900 may also include first radio transceiver 912 and second radio transceiver 914, internal universal serial bus (USB) port 916, and subscriber information module card (SIM card) 918 coupled to USB port 916. In some embodiments, the second radio transceiver 914 itself may be coupled to USB port 916, and communications from the baseband processor may be passed through USB port 916. The second radio transceiver may be used for wirelessly backhauling eNodeB 900.

Processor 902 and baseband processor 906 are in communication with one another. Processor 902 may perform routing functions, and may determine if/when a switch in network configuration is needed. Baseband processor 906 may generate and receive radio signals for both radio transceivers 912 and 914, based on instructions from processor 902. In some embodiments, processors 902 and 906 may be on the same physical logic board. In other embodiments, they may be on separate logic boards.

Processor 902 may identify the appropriate network configuration, and may perform routing of packets from one network interface to another accordingly. Processor 902 may use memory 904, in particular to store a routing table to be used for routing packets. Baseband processor 906 may perform operations to generate the radio frequency signals for transmission or retransmission by both transceivers 910 and 912. Baseband processor 906 may also perform operations to decode signals received by transceivers 912 and 914. Baseband processor 906 may use memory 908 to perform these tasks.

The first radio transceiver 912 may be a radio transceiver capable of providing LTE eNodeB functionality, and may be capable of higher power and multi-channel OFDMA. The second radio transceiver 914 may be a radio transceiver capable of providing LTE UE functionality. Both transceivers 912 and 914 may be capable of receiving and transmitting on one or more LTE bands. In some embodiments, either or both of transceivers 912 and 914 may be capable of providing both LTE eNodeB and LTE UE functionality. Transceiver 912 may be coupled to processor 902 via a Peripheral Component Interconnect-Express (PCI-E) bus, and/or via a daughtercard. As transceiver 914 is for providing LTE UE functionality, in effect emulating a user equipment, it may be connected via the same or different PCI-E bus, or by a USB bus, and may also be coupled to SIM card 918. First transceiver 912 may be coupled to first radio frequency (RF) chain (filter, amplifier, antenna) 922, and second transceiver 914 may be coupled to second RF chain (filter, amplifier, antenna) 924.

SIM card 918 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 900 is not an ordinary UE but instead is a special UE for providing backhaul to device 900.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 512 and 514, which may be Wi-Fi 902.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 502 for reconfiguration.

A GPS module 930 may also be included, and may be in communication with a GPS antenna 932 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 932 may also be present and may run on processor 902 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 10:
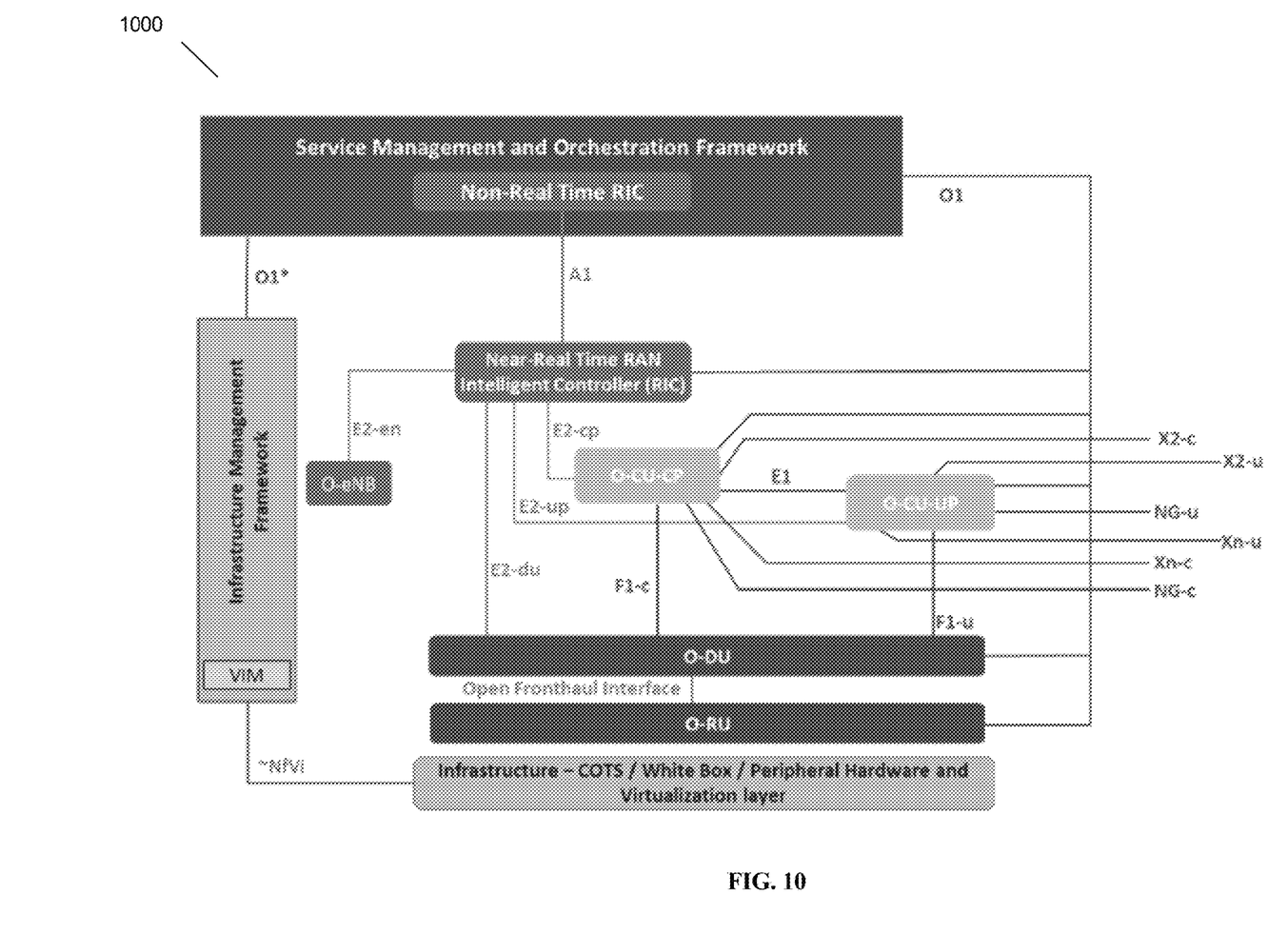
FIG. 10 is a schematic diagram of an OpenRAN core architecture, in accordance with some embodiments.

FIG. 10 is a schematic diagram of an OpenRAN core architecture, in accordance with some embodiments. The present disclosure is enabled for use with the disclosed architecture in this figure. Various nodes, for example the CU-CP and CU-UP nodes (here marked O-CU-CP and O-CU-UP to denote OpenRAN-compatible nodes), use SCTP and may use the methods and systems described herein for SCTP high availability. The node marked "Infrastructure—COTS/White Box/Peripheral Hardware and Virtualization Layer" may, in some embodiments, use the containerized architecture described herein and may use SCTP high availability features to provide this functionality to any of the higher layers and nodes, e.g., O-XXX, Near-RT RIC, etc. of this architecture as shown in the figure, in some embodiments.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method of providing Stream Control Transmission Protocol (SCTP) high availability in a cloud, the method comprising:
   keeping track, by an internal controller of an internal service discovery framework, internal changes in a cluster and SCTP associations of subscriber sessions with SCTP pods in the cluster;
   determining, by the internal controller, if any SCTP pods crash;
   informing, by the internal controller, remaining SCTP pods about changes in the environment;
   determining, by the controller, to distribute a number of connections in each remaining SCTP pod; and
   initiating, by the remaining pods, SCTP connection reestablishment.

2. A Stream Control Transmission Protocol (SCTP) microservice system comprising:
   an internal controller;
   a plurality of SCTP pods in communication with the internal controller;
   wherein the internal controller keeps track of internal changes in a cluster and SCTP associations of subscriber sessions with SCTP pods in the cluster, determines if any SCTP pods crash; informs remaining SCTP pods about changes in the environment, and determines distribution of a number of connections in each remaining SCTP pod; and
   wherein the remaining pods initiate SCTP connection reestablishment.

3. The method of claim 1, further comprising storing the SCTP associations in a database for each of the SCTP pods in the cluster.

4. The method of claim 1, further comprising determining, by the internal controller, which SCTP pods crash via heart beat failure.

5. The method of claim 1, further comprising fetching the stored SCTP associations from the database for a crashed SCTP pod.

6. The method of claim 1, further comprising determining, by the internal controller, to distribute the stored SCTP associations for the crashed SCTP pod among each remaining SCTP pod.

7. The method of claim 1, further comprising advertising newly shifted associations information.

8. The method of claim 1, further comprising initiating, by the remaining pods, SCTP connection reestablishment for stored SCTP associations for the crashed SCTP pod to a group of peer SCTP nodes.

9. The method of claim 2, further comprising storing the SCTP associations in a database for each of the SCTP pods in the cluster.

10. The method of claim 2, further comprising determining, by the internal controller, which SCTP pods crash via heart beat failure.

11. The method of claim 2, further comprising fetching the stored SCTP associations from the database for a crashed SCTP pod.

12. The method of claim 2, further comprising determining, by the internal controller, to distribute the stored SCTP associations for the crashed SCTP pod among each remaining SCTP pod.

13. The method of claim 2, further comprising advertising newly shifted associations information.

14. The method of claim 2, further comprising initiating, by the remaining pods, SCTP connection reestablishment for stored SCTP associations for the crashed SCTP pod to a group of peer SCTP nodes.

15. A non-transitory computer-readable medium containing instructions which, when executed by a processor with a memory, perform steps comprising:

keeping track, by an internal controller of an internal service discovery framework, internal changes in a cluster and SCTP associations of subscriber sessions with SCTP pods in the cluster;

determining, by the internal controller, if any SCTP pods crash;

informing, by the internal controller, remaining SCTP pods about changes in the environment;

determining, by the controller, to distribute a number of connections in each remaining SCTP pod; and initiating, by the remaining pods, SCTP connection reestablishment.

16. The non-transitory computer-readable medium of claim 15, further comprising storing the SCTP associations in a database for each of the SCTP pods in the cluster.

17. The non-transitory computer-readable medium of claim 15, further comprising determining, by the internal controller, which SCTP pods crash via heart beat failure.

18. The non-transitory computer-readable medium of claim 15, further comprising fetching the stored SCTP associations from the database for a crashed SCTP pod.

19. The non-transitory computer-readable medium of claim 15, further comprising determining, by the internal controller, to distribute the stored SCTP associations for the crashed SCTP pod among each remaining SCTP pod.

20. The non-transitory computer-readable medium of claim 15, further comprising advertising newly shifted associations information.

\* \* \* \* \*